United States Patent
Hong et al.

(10) Patent No.: US 10,389,816 B2
(45) Date of Patent: Aug. 20, 2019

(54) METHOD AND SYSTEM FOR REGISTERING CONTROL DEVICES IN SERVER

(71) Applicant: Samsung Electronics Co., Ltd., Suwon-si, Gyeonggi-do (KR)

(72) Inventors: Jinyoung Hong, Yongin-si (KR); Dongkeon Kong, Suwon-si (KR); Sehoon Kim, Seoul (KR); Eunhui Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 14/578,686

(22) Filed: Dec. 22, 2014

(65) Prior Publication Data

US 2015/0188762 A1  Jul. 2, 2015

(30) Foreign Application Priority Data

Dec. 27, 2013 (KR) .................. 10-2013-0164837

(51) Int. Cl.
| | |
|---|---|
| *G06F 15/16* | (2006.01) |
| *H04L 29/08* | (2006.01) |
| *H04L 12/28* | (2006.01) |

(52) U.S. Cl.
CPC ........ *H04L 67/125* (2013.01); *H04L 12/2807* (2013.01); *H04L 12/2809* (2013.01)

(58) Field of Classification Search
CPC ............... H04L 67/125; H04L 12/2807; H04L 12/2809
USPC ......................................................... 709/208
See application file for complete search history.

(56) References Cited

U.S. PATENT DOCUMENTS

| | | | | |
|---|---|---|---|---|
| 7,392,309 B2* | 6/2008 | Childers | ............. | H04L 12/2825 709/208 |
| 8,321,956 B2* | 11/2012 | Sadovsky | ............. | H04L 63/101 726/27 |
| 8,572,709 B2* | 10/2013 | Hockings | ................ | G06F 21/41 726/18 |
| 9,323,916 B1* | 4/2016 | Wu | ......................... | G06F 21/44 |
| 2006/0184530 A1* | 8/2006 | Song | ..................... | H04L 63/101 |
| 2007/0039039 A1* | 2/2007 | Gilbert | ................ | G06F 21/6218 726/4 |
| 2008/0005353 A1* | 1/2008 | Panabaker | ............ | H04L 67/125 709/238 |
| 2008/0201767 A1* | 8/2008 | Williams | ................ | G06F 21/31 726/6 |

(Continued)

*Primary Examiner* — Atta Khan
(74) *Attorney, Agent, or Firm* — Jefferson IP Law, LLP

(57) ABSTRACT

A method and a system for registering control devices are provided. A 1st control device, registered in a server, for registering a 2nd control device in the server, includes a communication unit configured to transmit and receive data to and from the server or other devices, an input unit configured to sense a user's input, and a controller configured to control the communication unit to request a shared account, used by the 1st or 2nd control device to log in the server, to receive the shared account from the server, to receive a registration request from the 2nd control device, to request, when a 1st user's input for approving the registration request is sensed, the server to register the 2nd control device, and to transmit, when a notice of completion for registration of the 2nd control device is received from the server, the shared account to the 2nd control device.

16 Claims, 9 Drawing Sheets

(56) References Cited

U.S. PATENT DOCUMENTS

| | | | | |
|---|---|---|---|---|
| 2009/0064346 | A1* | 3/2009 | Larsson | H04L 63/0807 726/29 |
| 2010/0332670 | A1* | 12/2010 | Park | H04L 67/025 709/229 |
| 2011/0055901 | A1* | 3/2011 | Karaoguz | G06F 21/10 726/4 |
| 2011/0066711 | A1* | 3/2011 | Kumar | H04L 41/0813 709/223 |
| 2012/0143978 | A1* | 6/2012 | Coussemaeker | H04W 12/08 709/208 |
| 2013/0086232 | A1* | 4/2013 | Hwang | H04L 12/2809 709/221 |
| 2013/0109355 | A1* | 5/2013 | Cope | H04W 12/06 455/411 |
| 2013/0318247 | A1* | 11/2013 | Liu | A63F 13/12 709/227 |
| 2014/0289824 | A1* | 9/2014 | Chan | G06F 9/54 726/5 |
| 2014/0289825 | A1* | 9/2014 | Chan | H04W 12/06 726/5 |

* cited by examiner

METHOD AND SYSTEM FOR REGISTERING CONTROL DEVICES IN SERVER

CROSS-REFERENCE TO RELATED APPLICATION(S)

This application claims the benefit under 35 U.S.C. § 119(a) of a Korean patent application filed on Dec. 27, 2013 in the Korean Intellectual Property Office and assigned Serial number 10-2013-0164837, the entire disclosure of which is hereby incorporated by reference.

TECHNICAL FIELD

The present disclosure relates to technologies for registering control devices in a server. More particularly, the present disclosure relates to a method and system for registering control devices in a server by using a control device registered in the server.

BACKGROUND

The term 'home network service' refers to a service capable of controlling a variety of devices at home. In the field of the home network service, devices are classified into control devices and smart-devices. Control devices refer to devices that control other devices which are called smart-devices. That is, smart-devices are operated under the control of the control devices. Users using a home network service can control one or more smart-devices via one or more control devices. Home network service users can control smart-devices via control devices in their homes or in places apart from their homes.

In order for users to use a home network service, each user must be registered in a server through a registration procedure. A server registration procedure may include a user registration and a device registration. A user registration is performed in order to create user accounts. A user registration may include a service registration.

The server registration procedure includes a process for entering users' personal information. Although new users can log into a server with sub accounts of user accounts registered in the server, they must perform a user registration procedure to use a home network service. There may be a case in which a user whose account is registered in a server wants to share the authority to use a home network service with another user. In such case, a method and system is required that allows the other user to perform a simple registration procedure to a server and to log in the server, thereby providing convenience and quick access.

Therefore a need exists for a method and system for allowing a second or additional user to register control devices in a server using a control device of a first or other user registered in the server.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for registering control devices in a server by using a control device registered in the server.

In accordance with an aspect of the present disclosure, a method for registering a 2nd control device in a server by a 1st control device registered in the server is provided. The method includes requesting a shared account, used by the 1st or 2nd control device to log in the server, from the server; receiving the shared account from the server, receiving a registration request from the 2nd control device, requesting, when a 1st user's input for approving the registration request is sensed, the server to register the 2nd control device, and transmitting, when a notice of completion for registration of the 2nd control device is received from the server, the shared account to the 2nd control device. The shared account is not displayed on the 1st or 2nd control device.

In accordance with another aspect of the present disclosure, a 1st control device, registered in a server, for registering a 2nd control device in the server is provided. The 1st control device includes a communication unit configured to transmit and receive data to and from the server or other devices, an input unit configured to sense a user's input, and a controller configured to control the communication unit to request a shared account, used by the 1st or 2nd control device to log in the server, from the server, to receive the shared account from the server, to receive a registration request from the 2nd control device, to request, when a 1st user's input for approving the registration request is sensed, the server to register the 2nd control device, and to transmit, when a notice of completion for registration of the 2nd control device is received from the server, the shared account to the 2nd control device, wherein the shared account is not displayed on the 1st or 2nd control device.

In accordance with another aspect of the present disclosure, a method for registering a 2nd control device in a server is provided. The method includes transmitting, when sensing a 2nd user's input, a request for registering the 2nd control device to a 1st control device registered with the server, receiving a shared account, transmitted from the server to the 1st control device, from the 1st control device, and requesting to log in with the shared account from the server. The shared account is not displayed on the 1st or 2nd control device.

In accordance with another aspect of the present disclosure, a 2nd control device is provided. The 2nd control device includes a communication unit configured to transmit and receive data to and from a server or other devices, an input unit configured to sense a user's input, and a controller configured to control the communication unit to transmit, when sensing a 2nd user's input via the input unit, a request of registering the 2nd control device to a 1st control device registered in the server, to receive a shared account, transmitted from the server to the 1st control device, from the 1st control device, and to request to log in with the shared account from the server, wherein the shared account is not displayed on the 1st or 2nd control device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
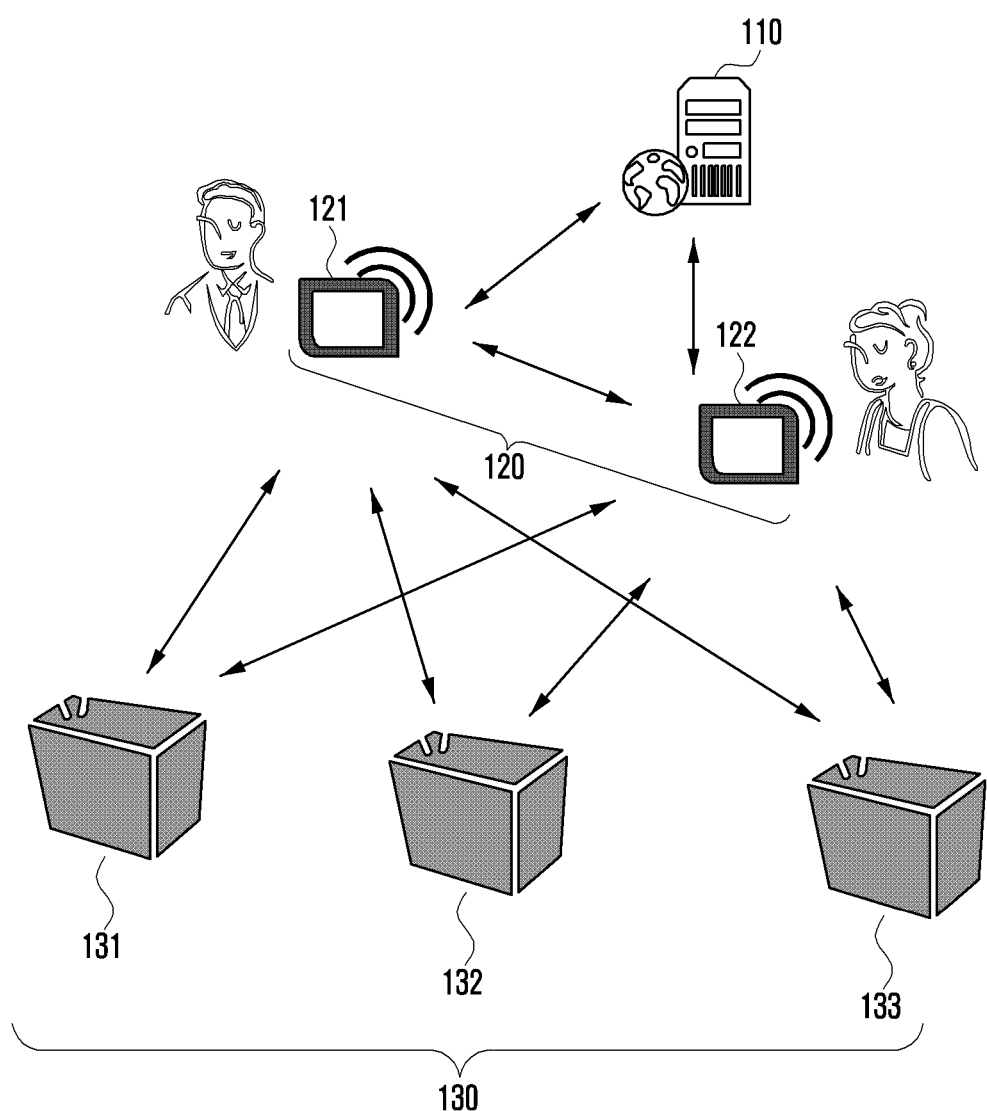
FIG. 1 is an illustration of a configuration of a system for registering control devices in a server according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Various embodiments according to the disclosure will be described in detail with reference to the accompanying drawings. It will be easily appreciated to those skilled in the art that various modifications, additions and substitutions are possible from an embodiment of the disclosure, and the scope of the disclosure should not be limited to the following various embodiments. The embodiment of the disclosure is provided such that those skilled in the art completely understand the disclosure. Therefore, the shapes of elements in the drawings are exaggerated to focus on the disclosure. In the drawings, the same or similar elements are denoted by the same reference numerals even though they are depicted in different drawings.

In the following description and claims, the term 'account/accounts' refers/refer to what users use to log in to a server via a control device/control devices registered in the server. An account includes an Identification (ID) and a password. The accounts include 'shared accounts' and 'unique accounts.'

FIG. 1 is an illustration of a configuration of a system for registering control devices in a server according to an embodiment of the present disclosure.

Referring to FIG. 1, the system includes a server 110, a set of control devices 120, and a group of smart devices 130. Although the embodiment is implemented to include one server 110, two control devices 121 and 122, and three smart devices 131, 132, and 133, it should be understood that the disclosure is not limited to it by the number of components.

The server 110 registers control devices after authentication. When a user logs in via a control device registered in the server 110, the server 110 provides the logged device with services. An example of the services is a service that allows the user to control the group of smart devices 130 via the set of control devices 120 registered in a server. Although the embodiment of the present disclosure shown in FIG. 1 illustrates that the server 110 communicates with the control devices 121 and 122, it should be understood that it can also communicate with the smart devices 131, 132, and 133. It should be understood that the server 110, the set of control devices 120 and the group of smart devices 130 are classified not by their names but by their functions, so that the control devices 120 may function as the smart devices 130.

The set of control devices 120 can be registered in the server 110 in order to control the group of smart devices 130. The set of control devices 120 refers to devices that can communicate with the server 110, the other control devices, or the group of smart devices 130. Examples of the set of control devices 120 are Internet Protocol Multimedia Subsystem (IPMS) terminals, tablet Personal Computers (tablet PCs), Portable Multimedia Players (PMPs), Personal Digital Assistants (PDAs), smart phones, mobile phones, digital albums, etc.

In the description and claims, one of the set of control devices 120 that receives a shared account from a server without using other control devices is called a 1st control device 121, and the other control device receiving a shared account from the 1st control device 121 is called a 2nd control device 122. In addition, a control device receiving a shared account from the 2nd control device 122 is called a 3rd control device.

The group of smart devices 130 communicates with the server 110 or the set of control devices 120. The group of smart devices 130 is controlled by the server 110 or the set of control devices 120. Examples of the group of smart devices 130 are PCs, facsimile machines, scanners, printers, televisions, set-top boxes, Digital Video Disc (DVD) players, Video Cassette Recorder (VCR) players, audio systems, camcorders, home gaming systems, coffee machines, electric rice cookers, refrigerators, air-conditioners, electric fans, headphones, vacuum cleaners, washing machines, humidifiers, gas stoves, microwave ovens, water purifiers, ovens, cameras, remote-controllers, interphones, sensors, lighters, smartphones, PMPs, PDAs, etc.

Figure 2:
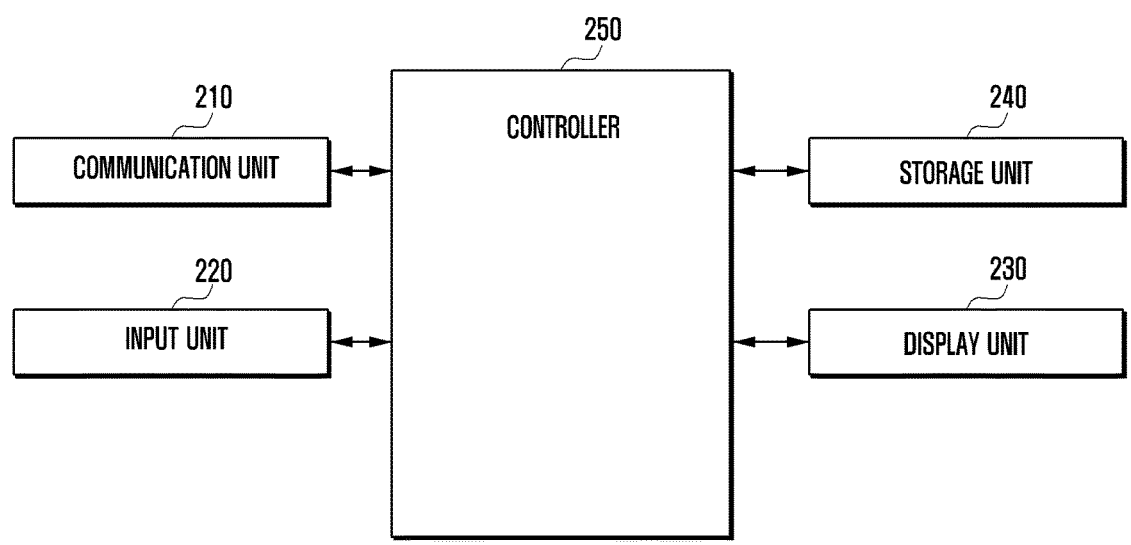
FIG. 2 is a schematic block diagram of a 1st control device according to an embodiment of the present disclosure.

FIG. 2 is a schematic block diagram of a 1st control device according to an embodiment of the present disclosure.

Referring to FIG. 2, the 1st control device 121 includes a communication unit 210, an input unit 220, a display unit 230, a storage unit 240, and a controller 250.

The communication unit 210 transmits/receive data to/from the server 110 or other devices. The communication unit 210 transmits a request for shared accounts to the server 110 and receives them therefrom. The communication unit 210 receives a request for registration from the 2nd control device 122 and transmits it to the server 110. The communication unit 210 is notified of completion of registering the 2nd control device 122 from the server 110, and transmits a shared account to the 2nd control device 122.

The input unit 220 senses a user's inputs. The input unit 220 includes a soft key or hard key and senses an input for selecting one or more options.

The display unit 230 displays information input by the user or information provided to the user. The display unit 230 displays applications related to functions according to the embodiment of the present disclosure. The display unit 230 displays a window for asking whether to approve the request for registration.

The storage unit 240 stores applications for supporting user functions and operations according to an embodiment of the present disclosure. The storage unit 240 also stores shared accounts transmitted from the server 110.

The controller 250 controls the flow of signals to support the 2nd control device 123 in a server. For example, the controller 250 requests a shared account from the server 110 and receives it therefrom. The controller 250 receives a registration request from the 2nd control device 122. When the controller 250 senses a 1st user's input that approves the registration request via the input unit 220, it requests the server 110 to register the 2nd control device 122. When the controller 250 receives a notice of completion of registering the 2nd control device 122 from the server 110, it controls the communication unit 210 to transmit the shared account to the 2nd control device 122.

Figure 3:
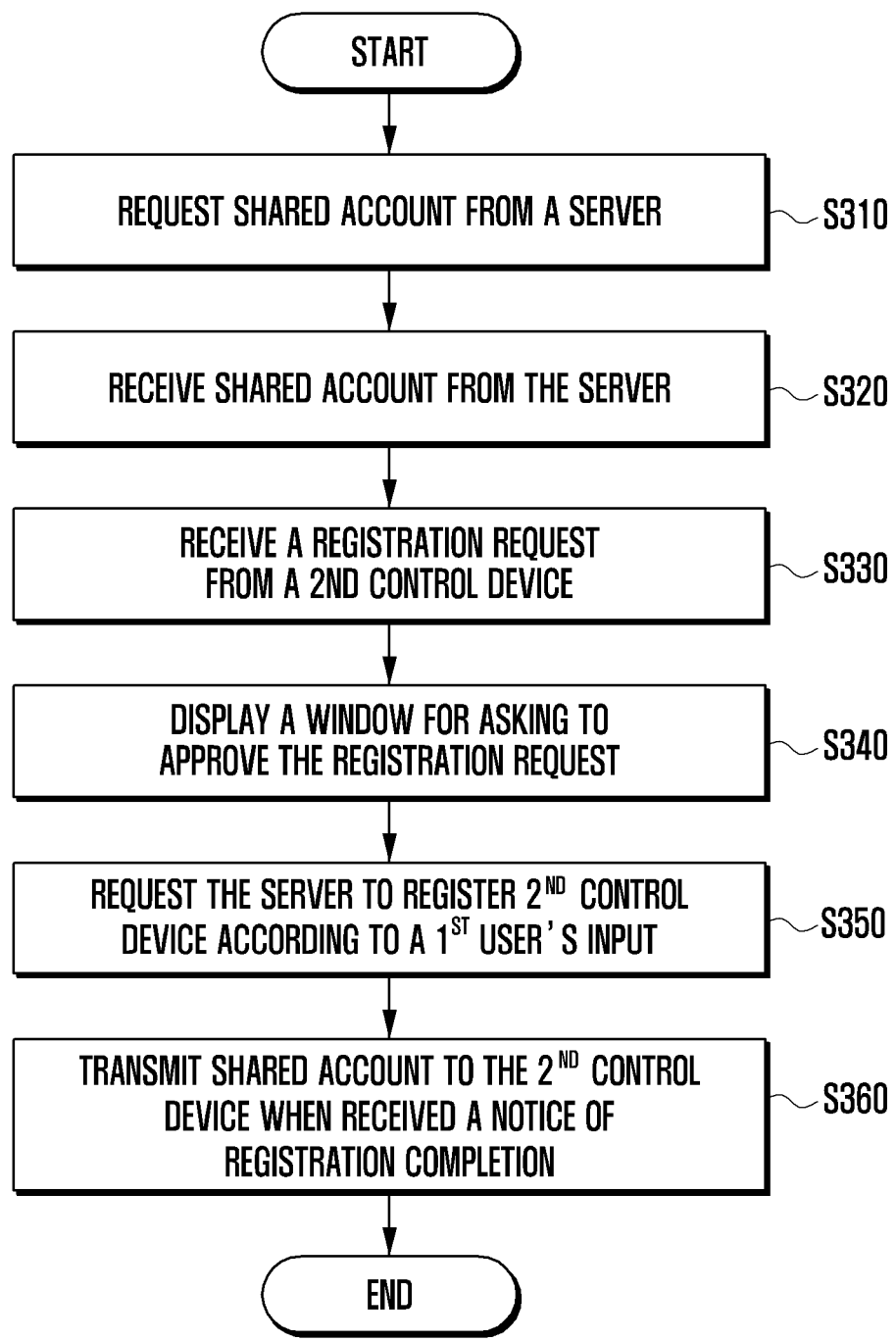
FIG. 3 is a flowchart of a method for registering a 2nd control device in a server by a 1st control device according to an embodiment of the present disclosure.

FIG. 3 is a flowchart of a method for registering a 2nd control device in a server by a 1st control device according to an embodiment of the present disclosure.

Referring to FIG. 3, the 1st control device 121, registered in a server 110, requests a shared account from the server 110 at operation S310. After receiving the request for a shared account, the server 110 performs an authentication of the user of the 1st control device 121. For example, if the 1st control device 121 logs in the server 110 by using the unique account, the server 110 authenticates the user for the unique account. When the authentication for the user of the 1st control device 121 is successful, the server 110 transmits a shared account to the 1st control device 121. The 1st control device 121 receives the shared account from the server 110 at operation S320.

When the 2nd control device 122 senses the 2nd user's input, it transmits a registration request to the 1st control device 121. In the description and claims, the 2nd user's input means an input that the control device requests to log in a server with a shared account. In the description and claims, the login with a shared account doesn't include a process of a user directly inputting a shared account. An example of the 2nd user's input is an operation for selecting at least one of soft keys and hard keys preset in the 2nd control device 122. When the 1st control device 121 receives a registration request from the 2nd control device 122 at operation S330, it displays a window for asking whether to approve the registration request at operation S340.

When the 1st control device 121 senses a 1st user's input that approves the request for registration, it requests the server 110 to register the 2nd control device 122 at operation S350. In the present disclosure, the 1st user's input means an input, to one control device, for approving request for registration of another control device. The 1st user's input may include an input for selecting at least one smart device controlled by the 2nd control device 122. The 1st user's input may include conditions for controlling at least one smart device by the 2nd control device 122. The conditions can be set based on time information or information regarding a location where the 1st control device 121 or the 2nd control device 122 is located. An example of the 1st user's input is an operation for selecting at least one of soft keys and hard keys that are preset. When the 1st control device 121 transmits a registration request to the server 110 at operation (S350), it can also transmit the fixed device Unique IDentification (UID) of the 2nd control device 122 to the server 110. When the 1st control device 121 receives a notice of registration completion of the 2nd control device 122 from the server 110, it transmits a shared account to the 2nd control device 122 at operation S360.

When the 1st control device 121 supports the server registration of the 2nd control device 122, the shared account is not displayed on the 1st 121 or 2nd 122 control device. In the present disclosure, the shared account may be called a hidden account. The 1st 121 or 2nd 122 control device receives a shared account and stores it. When the 1st 121 or 2nd 122 control device senses a user's input, it can log in the server 110 with the shared account. If a shared account is 'tmakxmgha,' it is not displayed on the display unit of the 1st 121 or 2nd 122 control device in the process of storing or logging in.

Figure 4:
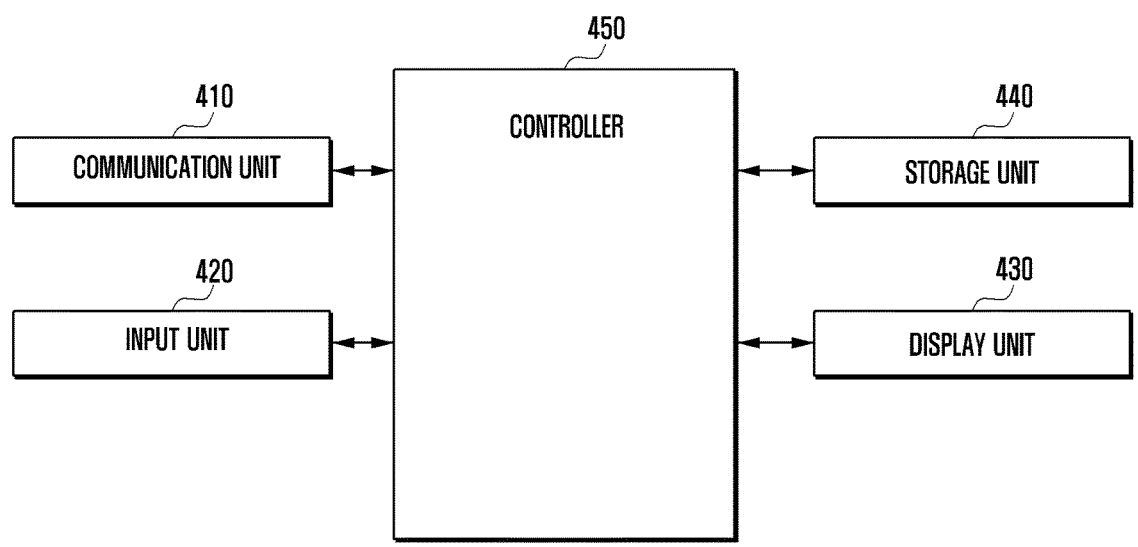
FIG. 4 is a schematic block diagram of a 2nd control device according to an embodiment of the present disclosure.

FIG. 4 is a schematic block diagram of a 2nd control device according to an embodiment of the present disclosure.

Referring to FIG. 4, the 2nd control device 122 includes a communication unit 410, an input unit 420, a display unit 430, a storage unit 440, and a controller 450. A description of the components which are the same as the embodiment shown in FIG. 2 will be skipped in what follows.

The communication unit 410 transmits a registration request to the 1st control device 121 registered in the server 110. The communication unit 410 receives a shared account from the 1st control device 121 so that the 2nd control device 122 can log in the server 110 by using the shared account. The input unit 420 includes a soft key or a hard key and senses an input for selecting at least one of the keys. The display unit 430 displays a window for requesting login, or a login window. The storage unit 440 stores the shared account transmitted from the server 110. The controller 450 receives a 2nd user's input via the input unit 420 and transmits the registration request to the 1st control device 121 registered in the server 110. When the 2nd control device 122 receives a shared account to log in the server 110 from the 1st control device 121, it controls the communication unit 410 to log in the server 110 by using the received, shared account.

Figure 5:
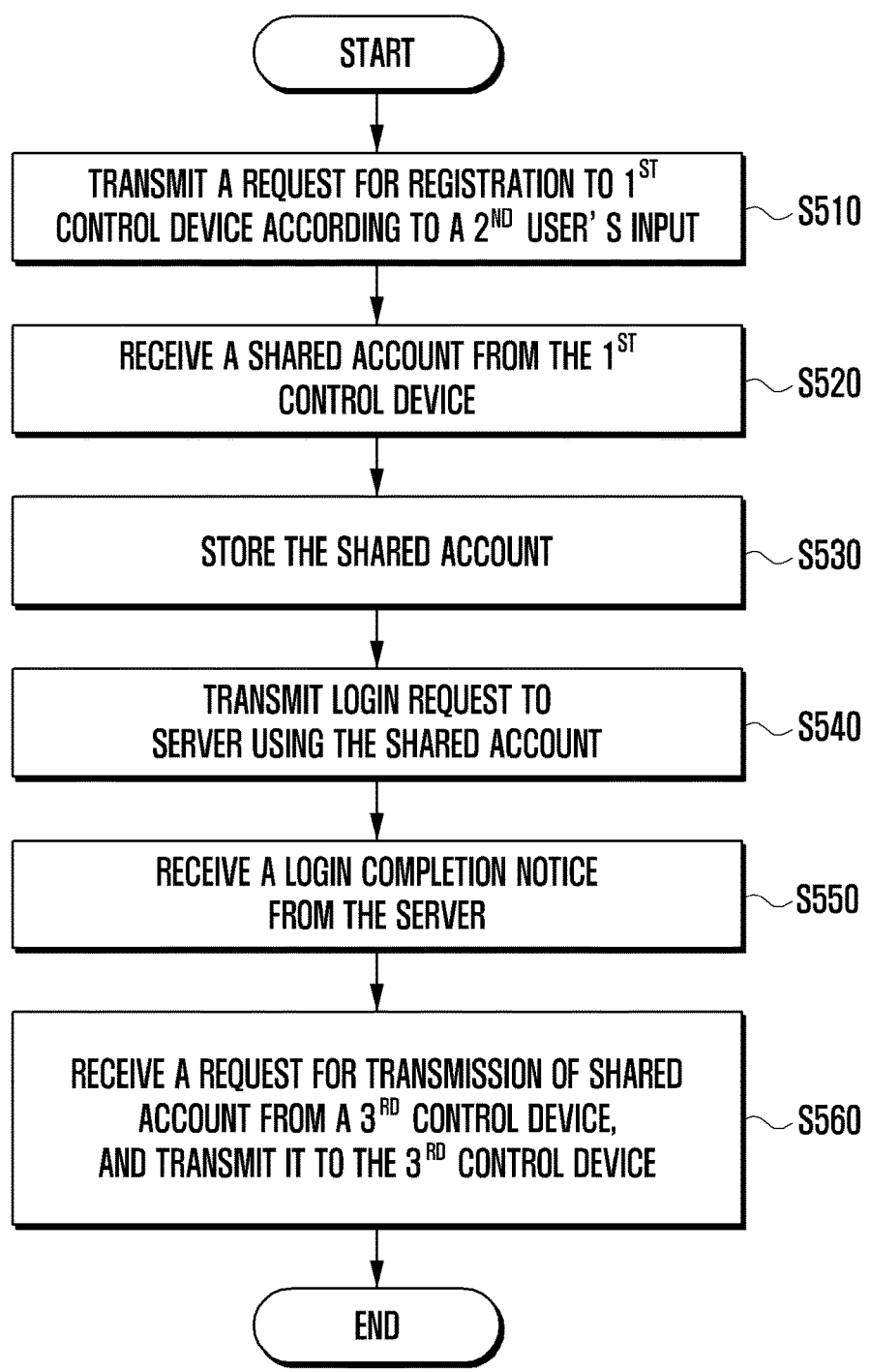
FIG. 5 is a flowchart of a method where a 2nd control device logs in a server by using a shared account according to an embodiment of the present disclosure.

FIG. 5 is a flowchart of a method where a 2nd control device logs in a server by using a shared account according to an embodiment of the present disclosure.

Referring to FIG. 5, when the 2nd control device 122 senses a 2nd user's input via the input unit 420, it transmits a registration request to the 1st control device 121 registered in the server at operation S510. An example of the 2nd user's input is an operation for selecting at least one of soft keys and hard keys preset in the 2nd control device 122. When the 2nd control device 122 transmits the registration request to the 1st control device 121, it can also transmit the fixed device UID to the 1st control device 121.

The 1st control device 121 receives a shared account from the server 110 and transmits it to the 2nd control device 122 at operation S520. The 2nd control device 122 receives the shared account from the 1st control device 121 and stores it at operation S530. The 2nd control device 122 transmits login request to the server 110 using the shared account at operation S540. The 2nd control device 122 receives a notice of login completion from the server 110 at operation S550. The notice of login completion may include information regarding at least one smart device controlled by the 2nd control device 122.

The embodiment of the present disclosure can be modified in such a way that: when the 2nd control device 122 senses a 2nd user's input via the input unit 420 at operation S510, it determines whether a shared account is stored in the storage unit 440; when the 2nd control device 122 ascertains that a shared account is stored in the storage unit 440, it can log in the server 110 by using the shared account at S540; and when the 2nd control device 122 ascertains that a shared account is not store in the storage unit 440, it transmits the registration request to a control device registered in a server.

Meanwhile, the 2nd control device 122 may re-transmit the shared account to another control device. When the 2nd control device 122 receives a request for transmission of the shared account from a 3rd control device, it transmits it to the 3rd control device at operation S560.

When any of the 1st control device 121, the 2nd control device 122, or the 3rd control device receives a shared account and senses a 2nd user's input, it can log in the server 110 by using the shared account. For example, if a shared account is 'tmakxmgha,' it is not displayed on the display unit of the 1st control device 121, 2nd control device 122, or 3rd control device in the process of reception or logging in.

Figure 6:
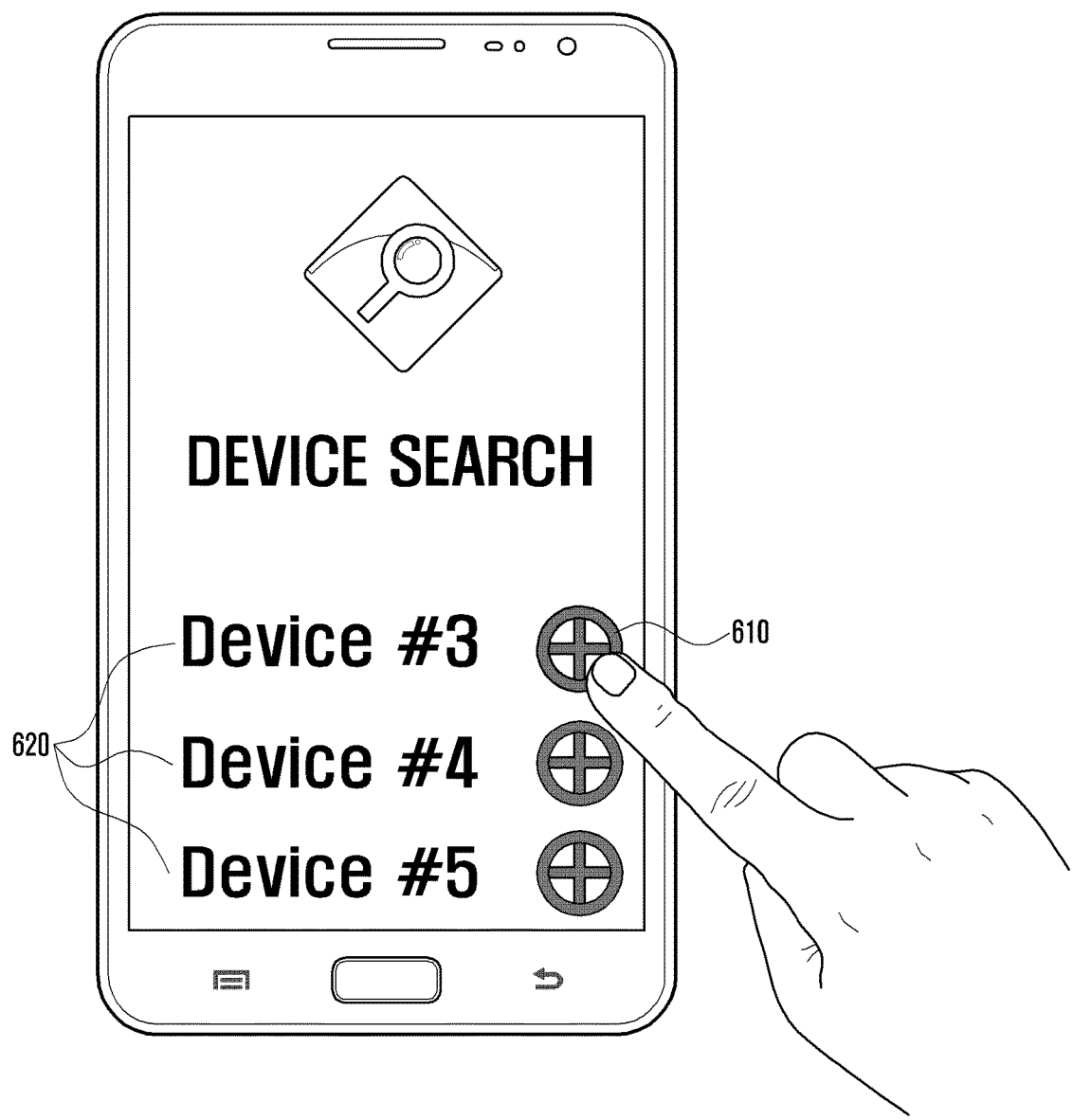
FIG. 6 is an illustration of a 1st user's inputting operation according to an embodiment of the present disclosure.

FIG. 6 is an illustration of a 1st user's inputting operation according to an embodiment of the present disclosure.

Referring to FIG. 6, and throughout the present disclosure, a 1st user's input means an input that a 1st control device makes to approve a request for registration of a 2nd control device. In the present disclosure, when the 1st control device senses a 1st user's input, it requests the server to register the 2nd control device.

The 1st control device searches for devices that transmitted registration requests and displays them on the display unit 230. In an embodiment of the present disclosure, the 1st user's input includes an input for selecting one or more searched devices displayed on the display unit 230. Referring to FIG. 6, the 1st control device displays three devices (Device Nos. 3, 4, and 5) on the list 620 on the display unit 230, where the user's finger selects a button 610 corresponding to Device No. 3. In an embodiment of the present disclosure, the 1st control device may display Fixed Device UIDs of the searched devices on the display unit 230.

The 1st user's input may also include an input for setting Authority and Policy allocated to the 2nd control device. In an embodiment of the present disclosure, the Authority and Policy may include information regarding at least one smart device that the 2nd control device can control. For example, when a refrigerator that can be controlled by the 1st control device, a washing machine, and an air-conditioner are displayed on the display unit 230, the user can select only the refrigerator. That is, the 1st user's input includes an input for selecting at least one smart device that can be controlled by the 2nd control device.

In an embodiment of the present disclosure, the Authority and Policy includes authorities that the 2nd control device has for smart devices respectively. For example, if a television is included on the list of smart devices that can be controlled by the 2nd control device, it can be implemented in such a way that only the volume and the channel can be controlled. Users can set authorities and policies according to control devices that made a request for registration or according to shared accounts.

In an embodiment of the present disclosure, Authority and Policy may include conditions for controlling at least one smart device by the 2nd control device. In an embodiment of the present disclosure, the conditions can be set based on information regarding a location where the 1st or 2nd control device is located. For example, only if 1st and 2nd control devices are located so that they can make near field communication with each other, it can be implemented in such a way that the 2nd control device can control at least one smart device. In addition, only if a 2nd control device and a smart device controlled by the 2nd control device are located so that they can make near field communication with each other, it can be implemented in such a way that the 2nd control device can control the smart device. In addition, only if a 2nd control device is located at a particular place (e.g., a home, an office, a factory, a school, etc.), it can be implemented in such a way that the 2nd control device can control at least one smart device. In another embodiment of the present disclosure, the conditions can also be set based on time information. For example, for Monday only, 1:30 p.m. to 5:30 p.m., it can be implemented in such a way that the 2nd control device can control at least one smart device. Although the various embodiments described above are implemented in such a way to employ only one condition, it should be understood that the input of the 1st control device includes not only one condition but may also include two or more conditions.

Figure 7:
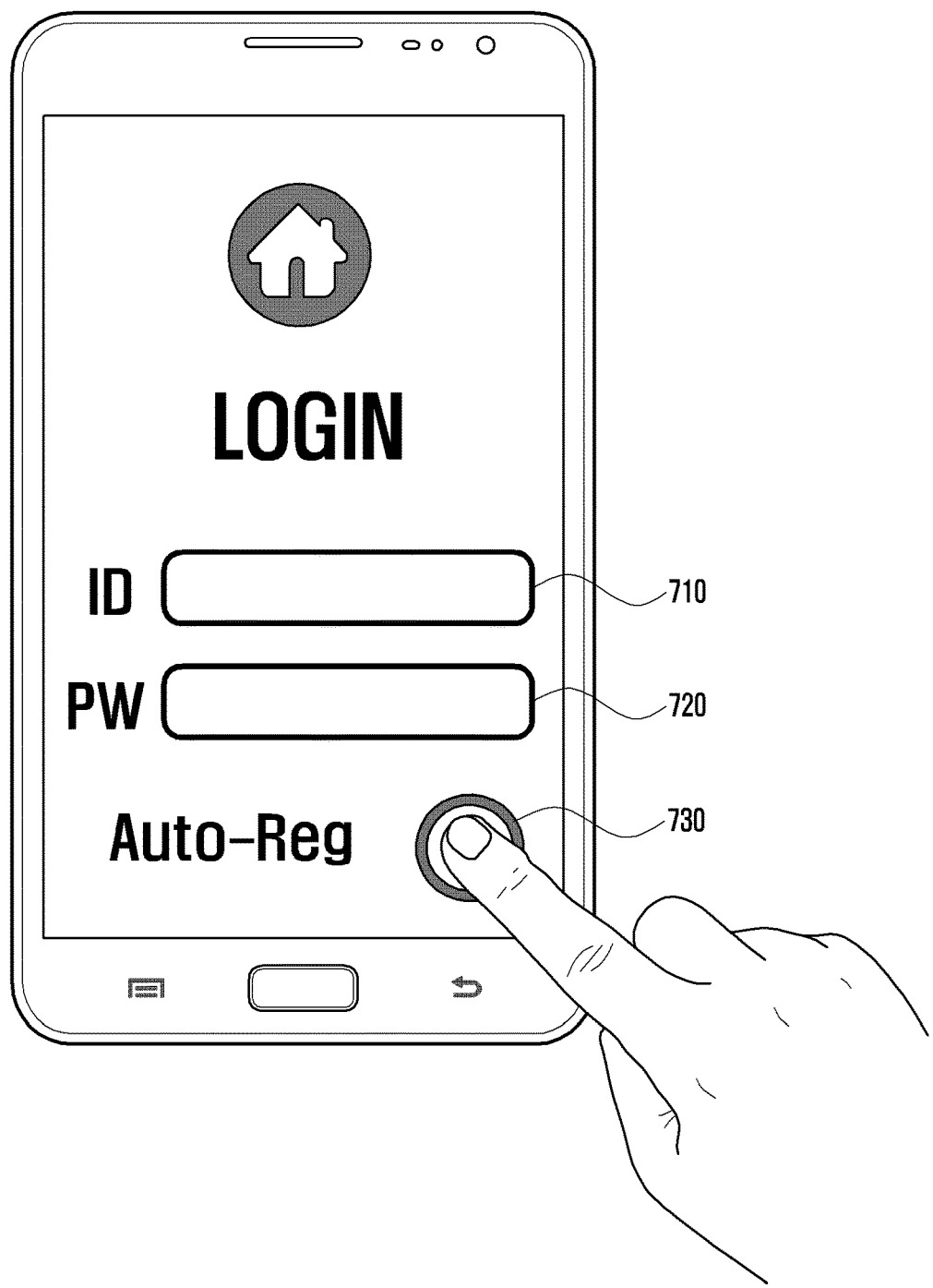
FIG. 7 is an illustration of a 2nd user's inputting operation according to an embodiment of the present disclosure.

FIG. 7 is an illustration of a 2nd user's inputting operation according to an embodiment of the present disclosure.

Referring to FIG. 7 and in the present disclosure, a 2nd user's input means an input that a control device makes to log in with a shared account. Referring to FIG. 7, the control device displays a window for requesting login on the display unit. If a user knew information regarding a unique account, he/she enters the ID 710 and the password 720 and logs in a server. In an embodiment of the present disclosure, the 2nd user's input may be an input for selecting at least one of soft keys and hard keys that are preset in the 2nd control device. For example, as shown in FIG. 7, the 2nd user's input may be implemented by a selecting of a button 730. In addition, the 2nd user's input may also be implemented with a hard key or a combination of a hard key and a soft key.

In an embodiment of the present disclosure, when the 2nd control device senses a 2nd user's input, it determines whether a shared account is stored in the storage unit 440. When the 2nd control device ascertains that a shared account is stored in the storage unit 440, it can request to log in with the stored shared account from the server. On the contrary, when the 2nd control device ascertains that a shared account isn't stored in the storage unit 440, it can transmit a registration request to a control device registered in the server.

Figure 8:
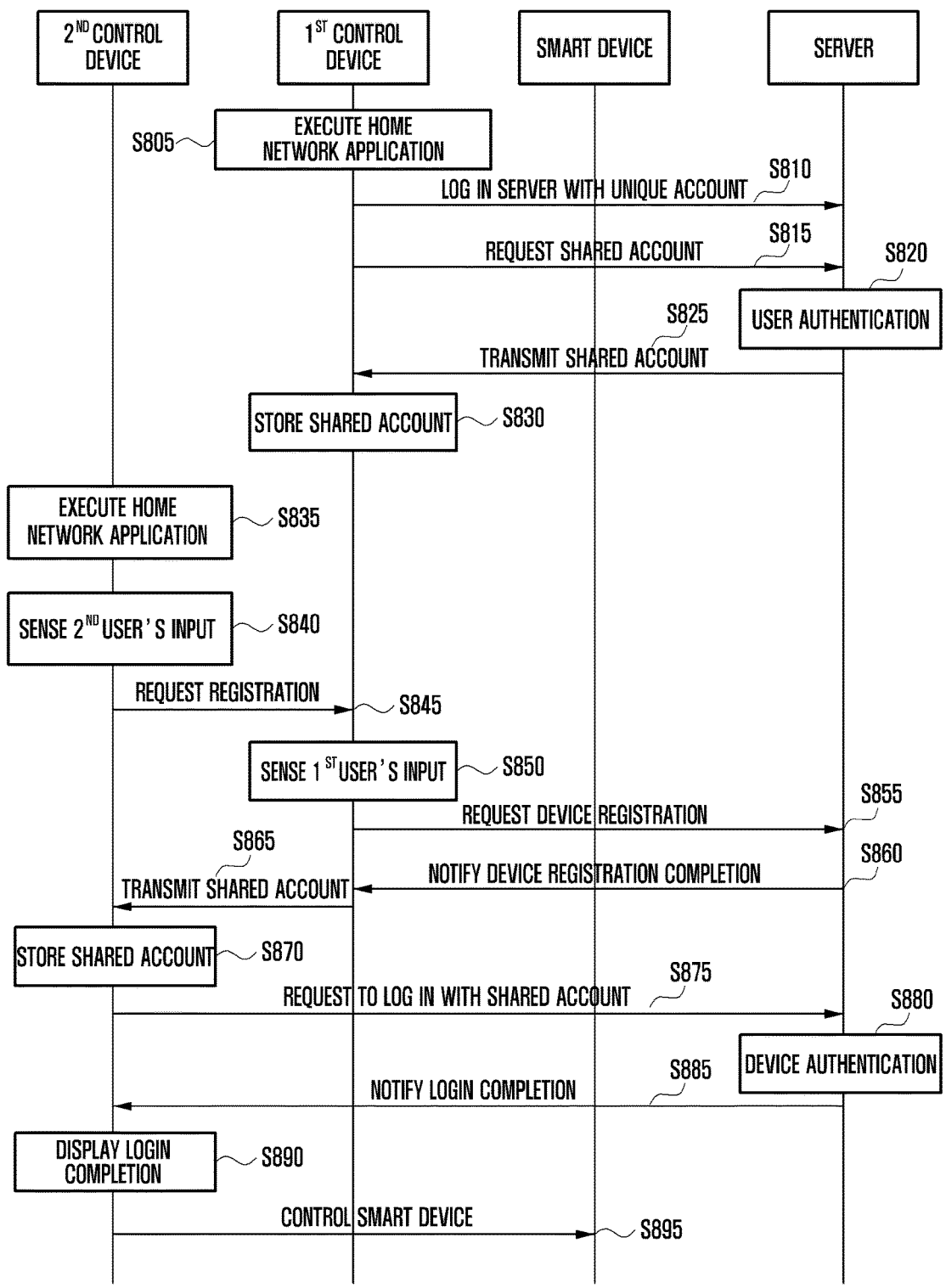
FIG. 8 is a signal flowchart of a method where the 2nd control device receives a shared account from the 1st control device and controls a smart device according to an embodiment of the present disclosure.

FIG. 8 is a signal flowchart of a method where the 2nd control device receives a shared account from the 1st control device and controls a smart device according to an embodiment of the present disclosure.

Referring to FIG. 8, the 1st control device executes an application for providing home network services according to the user's input at operation S805. If the application was not installed in the 1st control device, it is downloaded from a corresponding website and installed in the 1st control device. When the application is executed, the 1st control device displays a login window on the display unit, e.g., as shown in FIG. 7. The user enters a unique account and logs in a server at operation S810. For example, the user may enter an ID and password and logs in a server. After logging in, the 1st control device requests a shared account from the server at operation S815. The server is requested for a shared account and authenticates the user of the 1st control device requesting the shared account at operation S820. If the authentication for the user is successful, the server transmits the shared account to the 1st control device at operation S825. The 1st control device receives the shared account and stores it at operation S830.

The 2nd control device executes an application for providing a home network service at operation S835. If the application was not installed in the 2nd control device, it is downloaded from a corresponding website and installed in the 2nd control device. When the application is executed, the 2nd control device displays a login window on the display unit, e.g., as shown in FIG. 7. The 2nd control device senses a 2nd user's input at operation S840. The 2nd user's input may include an input for requesting login with the shared account.

In an embodiment of the present disclosure, the 2nd control device senses the 2nd user's input and transmits the registration request to the 1st control device registered in the server at operation S845. The 2nd control device may also transmit the Fixed Device UID at S845.

The 1st control device receives the registration request from the 2nd control device and displays a widow for asking whether to approve the registration request on the display unit 230, e.g., as shown in FIG. 6. The 1st control device senses a 1st user's input at operation S850. The 1st user's input may include an input for approving a request for registration of the 2nd control device. The 1st user's input may also include an input for setting the authority and policy allocated to the 2nd control device. The 1st control device senses the 1st user's input and requests the server to register the 2nd control device at operation S855. The 1st control device may also transmit the Fixed Device UID of the 2nd control device at S855. The 1st control device may also transmit information regarding the authority and policy allocated to the 2nd control device at S855. The server receives the request for registration of the 2nd control device and notifies the 2nd control device that the 2nd control device has been registered at operation S860.

The 1st control device transmits a shared account to the 2nd control device so that they can share the account at operation S865. The 2nd control device receives the shared account and stores it at operation S870. The 2nd control device requests to log in with the received, shared account from the server at operation S875. The server makes a device-authentication for the 2nd control device at operation S880. The server notifies the 2nd control device that the login by using the shared account has been completed at operation S885. The server may also transmit information regarding the authority and policy allocated to the 2nd control device at operation S885. The 2nd control device receives a notice of login completion from the server and displays it on the display unit at operation S890. After completing the registration, the 2nd control device can control a smart device corresponding to the shared account at operation S895. When the 1st control device also receives the information regarding an authority and policy at operation S895, it can control a smart device based on the authority and policy.

An embodiment may be modified in such a way that the 2nd control device senses the 2nd user's input at operation S840 and determines whether a shared account is stored in the storage unit 440. When the 2nd control device ascertains that shared account is stored in the storage unit 440, it requests to log in with the shared account from the server at operation S875, and then performs corresponding operations. On the contrary, when the 2nd control device ascertains that shared account is not stored in the storage unit 440, it transmits the registration request to the a 1st control device that was registered in the server at operation S845 and then performs corresponding operations.

Figure 9:
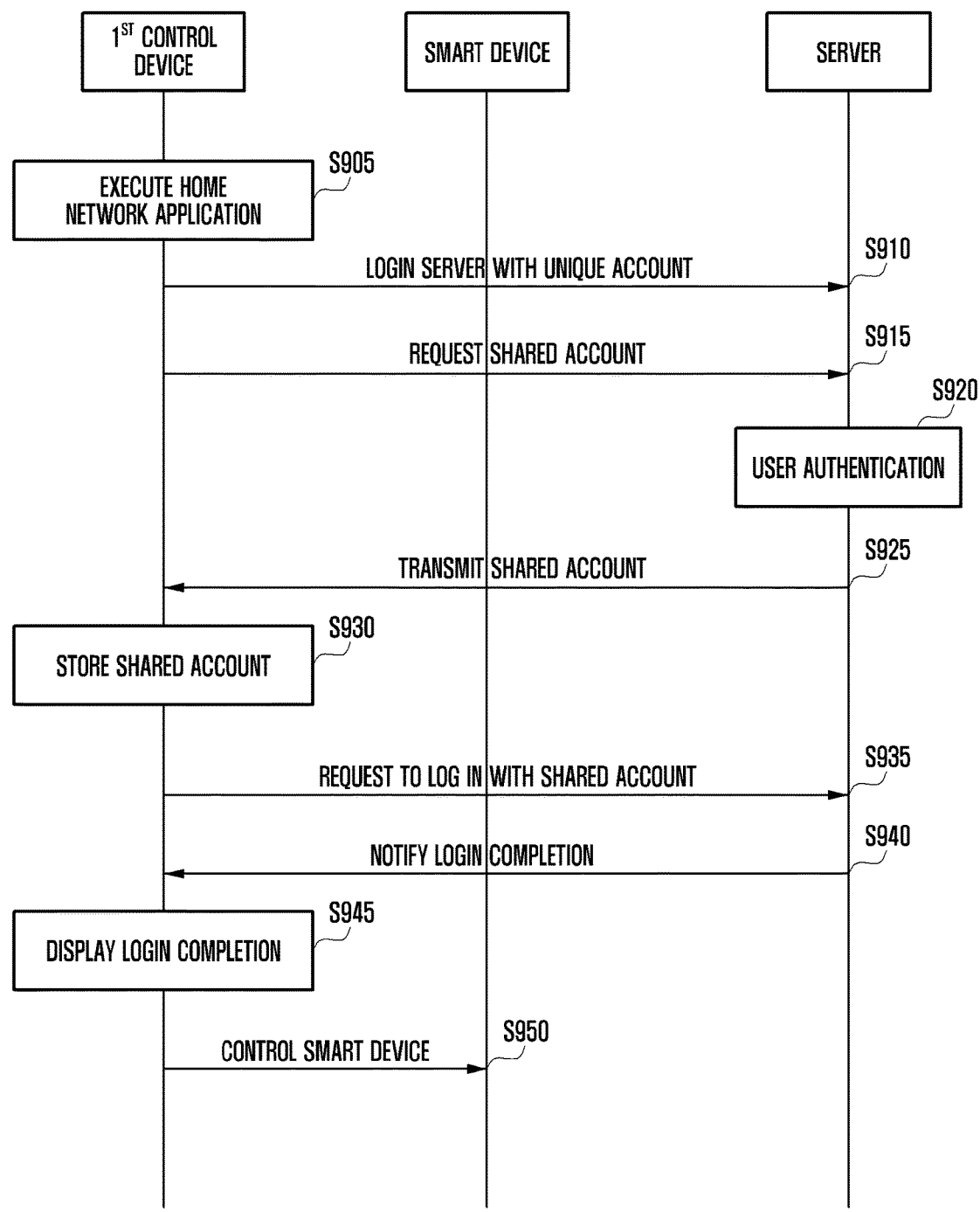
FIG. 9 is a signal flowchart of a method where the 1st control device receives a shared account from the server and controls a smart device according to an embodiment of the present disclosure.

FIG. 9 is a signal flowchart of a method where the 1st control device receives a shared account from the server and controls a smart device according to an embodiment of the present disclosure.

Referring to FIG. 9, if a 1st control device receives a shared account from a server, it can log in the server by using not a unique account but the shared account. If a user logs in the server with a shared account, he/she doesn't need to enter the unique account to the 1st control device.

The 1st control device executes an application for providing a home network service according to a user's operation at operation S905. If the application was not installed in the 1st control device, it is downloaded from a corresponding website and installed in the 1st control device. When the application is executed, the 1st control device displays a login window on the display unit, e.g., as shown in FIG. 7. The user enters a unique account and logs in a server at operation S910. For example, the user may enter an ID and password and logs in a server. After logging in to the server, the 1st control device requests a shared account from the server at operation S915. The server is requested for a shared account and authenticates the user of the 1st control device that requested the shared account at operation S920. If the authentication for the user is successful, the server transmits the shared account to the 1st control device at operation S925. The 1st control device receives the shared account and stores it at operation S930.

The 1st control device requests to log in with the received, shared account from the server at operation S935. The server notifies the 1st control device that the login by using the shared account has been completed at operation S940. The server may also transmit information regarding the authority and policy corresponding to the shared account to the 1st control device at S940. The 1st control device receives a notice of login completion from the server and displays it on the display unit at operation S945. After completing the registration, the 1st control device can control a smart device corresponding to the shared account at operation S950. When the 1st control device also receives the information regarding an authority and policy at operation S940, it can control a smart device based on the authority and policy.

As described above, the method and system according to an embodiment of the present disclosure can allow users to conveniently register their new accounts in a server without performing a user registration procedure. Since the method and system doesn't request personal information from users during the registration in a server, users' privacies can be protected. Since authorities and policies for accounts are managed not in a server but in control devices, the server doesn't have burden for registration and users can manage authorities and policies corresponding to shared accounts or can allocate authorities and policies to control devices according to the control devices.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for registering a 2nd control device in a server by a 1st control device registered in the server, the method comprising:
   receiving, by the 1st control device from the 2nd control device, a registration request for requesting a registration of the 2nd control device in the server;
   displaying, by the 1st control device, a window for selecting whether to approve the registration request upon receiving the registration request from the 2nd control device;
   determining, by the 1st control device, whether a signal including information indicating approval of a registration of the 2nd control device is received via a user interface;
   transmitting, by the 1st control device to the server, a registration request message to register the 2nd control device in the server if the signal is received;
   receiving, by the 1st control device from the server, a notice of completion for registration of the 2nd control device in the server;
   transmitting, by the 1st control device, a shared account request, used by the 1st control device or the 2nd control device to log in the server, to the server;
   receiving, by the 1st control device, the shared account from the server; and
   transmitting, by the 1st control device, a shared account to the 2nd control device upon receiving the notice,
   wherein the signal comprises information indicating at least one smart device that can be controlled by the 2nd control device and a condition for controlling each of the at least one smart device by the 2nd control device, and
   wherein the condition includes information regarding a location where the 1st control device or the 2nd control device is located.

2. The method of claim 1, wherein the shared account is not displayed on the 1st control device or the 2nd control device.

3. The method of claim 1, wherein the condition further includes time information.

4. The method of claim 1, wherein the signal including information indicating acceptance of a registration of the 2nd control device is received through at least one of soft keys and hard keys that are preset in the 1st control device.

5. A 1st control device, registered in a server, for registering a 2nd control device in the server, the 1st control device comprising:
   a display unit;
   a transceiver configured to transmit and receive data to and from the server or other devices; and
   at least one processor coupled with the transceiver and configured to control the transceiver to:
      receive, from the 2nd control device, a registration request for requesting a registration of the 2nd control device in the server,
      controls the display unit to display a window for selecting whether to approve the registration request upon receiving the registration request from the 2nd control device,
      determine whether a signal including information indicating approval of a registration of the 2nd control device is received via a user interface,
      control the transceiver to transmit, to the server, a registration request message to register the 2nd control device in the server if the signal is received,
      control the transceiver to receive, from the server, a notice of completion for registration of the 2nd control device in the server,
      control the transceiver to transmit a shared account request, used by the 1st control device or the 2nd control device to log in the server, to the server,
      control the transceiver to receive, by the 1st control device, the shared account from the server, and
      control the transceiver to transmit a shared account to the 2nd control device upon receiving the notice,
   wherein the signal comprises information indicating at least one smart device that can be controlled by the 2nd control device and a condition for controlling each of the at least one smart device by the 2nd control device, and
   wherein the condition includes information regarding a location where the 1st control device or the 2nd control device is located.

6. The 1st control device of claim 5, wherein the shared account is not displayed on the 1st control device or the 2nd control device.

7. The 1st control device of claim 5, wherein the condition further includes time information.

8. The 1st control device of claim 5, wherein the signal including information indicating acceptance of a registration of the 2nd control device is received through selecting at least one of soft keys and hard keys that are preset in the 1st control device.

9. A method for registering a 2nd control device in a server, the method comprising:
   transmitting, by the 2nd control device to a 1st control device, a registration request for requesting a registration of the 2nd control device in the server;
   receiving, by the 2nd control device, a shared account from the 1st control device if a signal including information indicating approval of a registration of the 2nd control device is received via a user interface by the 1st control device, wherein the shared account is transmitted from the server to the 1st control device;
   transmitting, by the 2nd control device, a request for logging in with the shared account to the server; and
   receiving, by the 2nd control device from the server, a notification message indicating completion of the logging in with the shared account,
   wherein the 1st control device is registered in the server and the 2nd control device is registered in the server by the 1st control device transmitting a registration request message to register the 2nd control device in the server, wherein the shared account is not displayed on the 1st control device or the 2nd control device, wherein the notification message comprises information indicating at least one smart device that can be controlled by the 2nd control device and a condition for controlling each of the at least one smart device by the 2nd control device, and wherein the condition includes information regarding a location where the 1st control device or the 2nd control device is located.

10. The method of claim 9, wherein the condition further includes time information.

11. The method of claim 9, further comprising:

storing, by the 2nd control device, the shared account transmitted from the 1st control device;

receiving, by the 2nd control device, a request for transmission of the shared account from a 3rd control device; and transmitting, by the 2nd control device, the shared account to the 3rd control device.

12. The method of claim 9, wherein the transmitting the request for registering the 2nd control device comprises:

receiving, by the 2nd control device, a signal requesting the registering the 2nd control device through at least one of soft keys and hard keys that are preset in the 2nd control device; and transmitting, by the 2nd control device to the 1st control device, the request for registering the 2nd control device to the server.

13. A 2nd control device comprising:

a transceiver configured to transmit and receive data to and from a server or other devices; and at least one processor coupled with the transceiver and configured to:

control the transceiver to transmit, to a 1st control device, a registration request for requesting a registration of the 2nd control device in the server, control the transceiver to receive a shared account from the 1st control device if a signal including information indicating approval of a registration of the 2nd control device is received via a user interface by the 1st control device, control the transceiver to transmit a request for logging in with the shared account to the server, and control the transceiver to receive a notification message indicating completion of the logging in with the shared account from the server, wherein the 1st control device is registered in the server and the 2nd control device is registered in the server by the 1st control device transmitting a registration request message to register the 2nd control device in the server, wherein the shared account is transmitted from the server to the 1st control device, wherein the shared account is not displayed on the 1st or 2nd control device, wherein the notification message comprises information indicating at least one smart device that can be controlled by the 2nd control device and a condition for controlling each of the at least one smart device by the 2nd control device, and wherein the condition includes information regarding a location where the 1st control device or the 2nd control device is located.

14. The 2nd control device of claim 13, wherein the condition further includes time information.

15. The 2nd control device of claim 13, further comprising:

a memory coupled with the at least one processor and configured to store data, wherein the at least one processor is configured to:

control the memory to store the shared account transmitted from the 1st control device; and control the transceiver to receive a request for transmission of the shared account from a 3rd control device, and transmit the shared account to the 3rd control device.

16. The 2nd control device of claim 13, wherein:

the at least one processor controls the transceiver to receive a signal requesting the registering the 2nd control device through at least one of soft keys and hard keys that are preset in the 2nd control device.

* * * * *